US005889548A

United States Patent [19]
Chan

[11] Patent Number: 5,889,548
[45] Date of Patent: Mar. 30, 1999

[54] TELEVISION RECEIVER USE METERING WITH SEPARATE PROGRAM AND SYNC DETECTORS

[75] Inventor: Cheuk Wan Chan, Tarpon Springs, Fla.

[73] Assignee: Nielsen Media Research, Inc., New York, N.Y.

[21] Appl. No.: 654,309

[22] Filed: May 28, 1996

[51] Int. Cl.[6] .......... H04N 7/10
[52] U.S. Cl. .......... 348/4; 455/2
[58] Field of Search .......... 348/4, 1, 6, 10; 455/2, 6.2, 6.3; H04N 7/10

[56] References Cited

U.S. PATENT DOCUMENTS

| | | | |
|---|---|---|---|
| 2,935,557 | 5/1960 | Bushman | 348/4 |
| 3,130,265 | 4/1964 | Leonard | 178/6 |
| 4,025,851 | 5/1977 | Haselwood et al. | 325/31 |
| 4,425,578 | 1/1984 | Haselwood et al. | 358/84 |
| 4,613,904 | 9/1986 | Lurie | 358/142 |
| 4,697,209 | 9/1987 | Kiewit et al. | 358/84 |
| 4,764,808 | 8/1988 | Solar | 358/84 |
| 4,807,031 | 2/1989 | Broughton et al. | 358/142 |
| 4,843,470 | 6/1989 | Wook et al. | 348/506 |
| 4,847,685 | 7/1989 | Gall et al. | 358/84 |
| 5,329,370 | 7/1994 | Yazolino et al. | 548/734 |
| 5,404,160 | 4/1995 | Schober et al. | 348/1 |
| 5,450,122 | 9/1995 | Keene | 348/1 |
| 5,450,490 | 9/1995 | Jensen et al. | 380/6 |
| 5,456,112 | 10/1995 | Nakao | 348/4 |
| 5,608,445 | 3/1997 | Mischler | 348/4 |
| 5,629,739 | 5/1997 | Dougherty | 348/1 |

*Primary Examiner*—Bryan Tung
*Attorney, Agent, or Firm*—Marshall, O'Toole, Gerstein, Murray & Borun

[57] ABSTRACT

An apparatus for acquiring a modified baseband video signal from a CRT of a receiver includes a capacitive pick-up disposed on an external surface of a housing of the receiver and adjacent to a socket of the CRT, and two inductive pick ups having substantially mutually perpendicular axes disposed on the external surface of the housing and spaced apart from the capacitive pickup. The capacitive pick up senses a video signal of the receiver, and the inductive pick ups sense horizontal and vertical sync signals of the receiver. A horizontal sync component of the video signal is replaced in response to the horizontal sync signal sensed by the inductive pick ups. A filter is arranged to filter out a band of frequencies centered about an integral multiple of a power line frequency. The capacitive pick up has a capacitive pick up plate and a capacitive shield plate which is located farther from the socket than the capacitive pick-up plate. An axis of one of the two inductive pick ups is parallel to an axis of the CRT.

24 Claims, 8 Drawing Sheets

TELEVISION RECEIVER USE METERING WITH SEPARATE PROGRAM AND SYNC DETECTORS

TECHNICAL FIELD OF THE INVENTION

The present invention relates to a sensor for non-invasively sensing a video signal of a television receiver.

BACKGROUND OF THE INVENTION

Many methods have been used in audience measurement systems for determining the channels or programs to which television receivers, located in statistically sampled households, are tuned. These methods generally involve sensing signals in the video portions of the monitored television receivers. For example, because the local oscillator frequency of a monitored television receiver is dependent upon the channel to which the monitored television receiver is tuned, the output of the local oscillator may be sensed in order to determine the tuned channel. As another example, signal injection systems sequentially inject a signal on the various carrier frequencies to which a monitored television receiver may be tuned. The injection signal is then sensed in order to identify the tuned channel.

In order to sense a video signal, most audience measurement systems, particularly those which have proven reliable enough for practical use, require at least partial disassembly of the monitored television receiver and a direct connection (such as by soldering) to a point in the video circuitry. Such invasive methods are believed to decrease the likelihood that a sampled household will agree to co-operate in a television audience survey. This loss of cooperation, in turn, both increases the costs of operating the survey and decreases the reliability of the data obtained. Hence, there has been a longstanding need in the television audience field for a reliable non-invasive sensor which does not require physical access by an installing technician to the inside of a cabinet or housing of a monitored television receiver.

Non-invasive sensors, which are located adjacent a sampled television receiver and which measure the frequency and phase of vertical and horizontal synchronization signals that are part of the transmitted television program, are known. For example, Leonard, U.S. Pat. No. 3,130,265, discloses an audience measurement method which requires each transmitter in the surveyed broadcast area to have a unique sync phase. However, the control of the phase of all the transmitters is a condition that has proven impossible to establish.

Gall, in U.S. Pat. No. 4,847,685, discloses a system which (i) detects the phase of both vertical and horizontal synchronization signals for all broadcast stations in a monitored broadcast market, (ii) measures the phase of these signals at a sampled receiver, and (iii) compensates for the distances through which the signals travel from the broadcast stations to both a central monitoring site and a sampled receiver. Solar, in U.S. Pat. No. 4,764,808, discloses a system for determining, from a non-invasive measurement of the horizontal sync frequency of a sampled receiver, the color burst frequency of the station being viewed. This measured frequency is compared with a centrally maintained tabulation of the deviation of each station's actual color burst frequency from a standard value in order to determine the station being viewed. However, neither the Solar system nor the Gall system can discriminate among multiple programs originating from a single location. For example, two channels of satellite-distributed programming that originate at the same uplink facility could have the same color burst frequency and therefore be indistinguishable to the systems disclosed in the Solar and Gall patents. Also, the Solar and Gall systems would be unwieldy if a large number of programming sources were to be measured.

Other systems are content-based systems and identify the programs to which television receivers are tuned either by reading ancillary codes embedded in the programs or by extracting patterns from the programs for comparison to a library of reference patterns. Systems which sense embedded ancillary codes are taught, inter alia, in Haselwood, et al., U.S. Pat. No. 4,025,851, the disclosure of which is herein incorporated by reference, and in Keene, U.S. Pat. No. 5,450,122. The use of pattern recognition is disclosed, inter alia, in Kiewit, et al., U.S. Pat. No. 4,697,209, the disclosure of which is herein incorporated by reference.

Content-based systems typically measure alternating currents and are, therefore, more vulnerable to noise as the measurement bandwidth increases. In order to maximize the signal-to-noise ratio, most of these content-based systems use invasive direct connections to audio or video circuitry within a monitored television receiver. By contrast, there are known content-based systems which non-invasively sense embedded ancillary codes where the ancillary codes (or pattern signatures) vary slowly. For example, a system which non-invasively senses an ancillary code embedded in an audio signal is disclosed in Jensen, et al., U.S. Pat. No. 5,450,490 (this system uses a microphone to pick up the audio in which the ancillary code is embedded). Another system, which switches the luminance of sequential lines of a video signal in order to insert an ancillary code and which senses the ancillary code non-invasively, is disclosed in Schober, et al., U.S. Pat. No. 5,404,160. Although the system disclosed in this Schober, et al. patent operates on a video signal, it does so at data rates that would more conventionally be labeled "audio"—for example, at the 15.6 kHz horizontal line frequency of an NTSC signal.

The present invention is directed to a non-invasive sensor which solves one or more of the above noted problems.

SUMMARY OF THE INVENTION

In accordance with one aspect of the present invention, a sensing arrangement for non-invasively sensing signals of a receiver comprises a program signal sensor and a sync signal sensor. The program signal sensor is disposed (i) on an exterior surface of a housing, (ii) proximate to the receiver, and (iii) in a position to sense program content carried by a program signal. The program signal sensor is arranged to acquire the program signal when the receiver is in operation. The sync signal sensor is disposed on the exterior surface of the housing and in a position to sense synchronization, and is spaced apart from the program signal sensor.

In accordance with another aspect of the present invention, a system for non-invasively sensing signals of a receiver comprises a video signal detecting apparatus, a sync signal detecting apparatus, and a signal processing means. The video signal detecting apparatus has a capacitive pick up and is disposed on an exterior surface of a housing proximate to a socket of a CRT of the receiver. The video signal detecting apparatus acquires a video signal when the receiver is in operation. The acquired video signal has a first horizontal sync component. The sync signal detecting apparatus includes an inductive pick up, is disposed on an exterior surface of the housing, and is spaced apart from the video signal detecting apparatus. The sync signal detecting apparatus has as an output a second horizontal sync component. The signal processing means processes the acquired video signal and creates a modified video signal by replacing the first horizontal sync component in response to the second horizontal sync component. The signal processing means supplies the modified video signal as an input to a recognition apparatus.

In accordance with still another aspect of the present invention, an apparatus for acquiring a modified baseband video signal from a CRT comprises a video probe, a sync probe, and a sync signal replacing means. The video probe has a video signal output and is disposed adjacent to a socket of the CRT. The sync probe has a sync signal output and is spaced apart from the video probe. The sync signal replacing means has the sync signal output and the video signal output as inputs and replaces a horizontal sync component of the video signal output with a horizontal sync signal in response to the sync signal output. The sync signal replacing means has as an output the modified baseband video signal.

In accordance with yet another aspect of the present invention, a method of reading an ancillary code transmitted with a television broadcast received in a dwelling and displayed on a television receiver having a CRT comprises the steps of a) acquiring a baseband video signal by use of a capacitive sensor disposed on an exterior of the receiver proximate to a socket of the CRT, b) acquiring a horizontal sync signal by use of an inductive sensor disposed on the exterior of the receiver in spaced apart relation to the capacitive sensor, c) removing, from the baseband video signal, a horizontal sync component thereof, d) replacing the removed horizontal sync component with a standard horizontal sync signal in response to the horizontal sync signal acquired by the inductive sensor, thereby creating a modified video baseband signal, and e) reading the ancillary code from the modified baseband video signal.

In accordance with a further aspect of the present invention, a pattern recognition method for recognizing one of a plurality of television programs received in a dwelling and displayed on a television receiver having a CRT comprises the steps of a) acquiring a baseband video signal by use of a capacitive sensor disposed on an exterior of the receiver proximate to a socket of the CRT, b) acquiring a horizontal sync signal by use of an inductive sensor disposed on the exterior of the receiver in spaced apart relation to the capacitive sensor, c) removing, from the baseband video signal, a horizontal sync component thereof, d) replacing the removed horizontal sync component with a horizontal sync signal in response to the horizontal sync signal acquired by the inductive sensor, thereby creating a modified video baseband signal, and e) supplying the modified video baseband signal to a pattern recognition apparatus.

DESCRIPTION OF THE DRAWING

These and other features and advantages of the present invention will become more apparent from a detailed consideration of the invention when taken in conjunction with the drawings in which.

DETAILED DESCRIPTION

Figure 1:
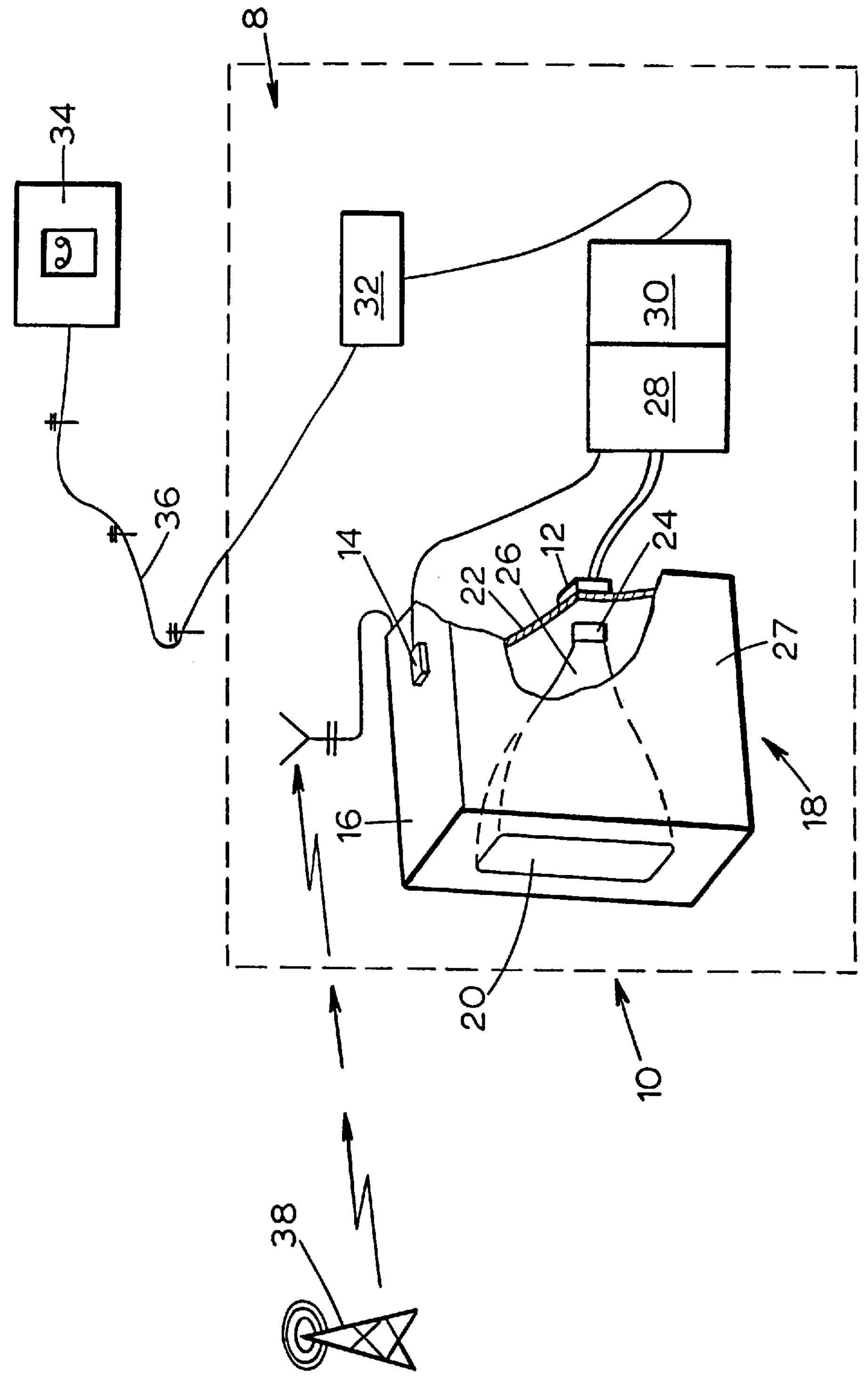
FIG. 1 is a schematic block diagram of a television audience measurement system incorporating a non-invasive horizontal and vertical synchronization sensor and a non-invasive video sensor according to the present invention.

In accordance with the present invention, a receiver monitoring system 8, which makes television tuning measurements in a statistically sampled dwelling 10, includes a capacitive non-invasive video sensor 12 and a non-invasive horizontal and vertical sync sensor 14 which are affixed on separate outer surfaces of a housing or cabinet 16 of a television receiver 18. The television receiver 18 has a display 20 in the form of a single cathode ray tube. Alternatively, the television receiver 18 may have a plurality of cathode ray tubes which are used in an additively colored projection display. As will be discussed hereinafter in greater detail, the capacitive non-invasive video sensor 12 is preferably attached on a housing back surface 22 of the housing 16 along an extension of the longitudinal axis of the display 20 so that the capacitive non-invasive video sensor 12 is immediately behind a socket 24 of the display 20, while the non-invasive horizontal and vertical sync sensor 14 is preferably attached to the housing 16 on the top thereof in a position generally above a neck portion 26 of the display 20. It should be noted that other locations, e.g., on a side 27 of the housing 16, may also be considered for placement of the non-invasive horizontal and vertical sync sensor 14. Thus, the capacitive non-invasive video sensor is approximately concentric to the longitudinal axis of the display 20, and the non-invasive horizontal and vertical sync sensor 14 is positioned radially from the longitudinal axis of the display 20.

Video signals from the capacitive non-invasive video sensor 12 and from the non-invasive horizontal and vertical sync sensor 14 are processed by a video processor 28 which provides an output to a program recognition apparatus 30 that may be co-located with the video processor 28. Alternatively, the program recognition apparatus 30 may be disposed in a central data storage and forwarding unit 32 which also serves to communicate composited data to a central data collection office 34 via the public switched telephone network 36, as is known in the audience measurement art. The program recognition apparatus 30 is expected, in most cases, to read program-identifying ancillary codes added to television signals either at a local broadcast station 38 or at some earlier point in the signal distribution chain. It should be understood, however, that video signals from the capacitive non-invasive video sensor 12 and the non-invasive horizontal and vertical sync sensor 14 could equally well be used in other television audience measurement systems, such as those which extract pattern signatures from video signals and which use those extracted pattern signatures to identify the programs being viewed in the statistically sampled dwelling 10.

Figure 2:
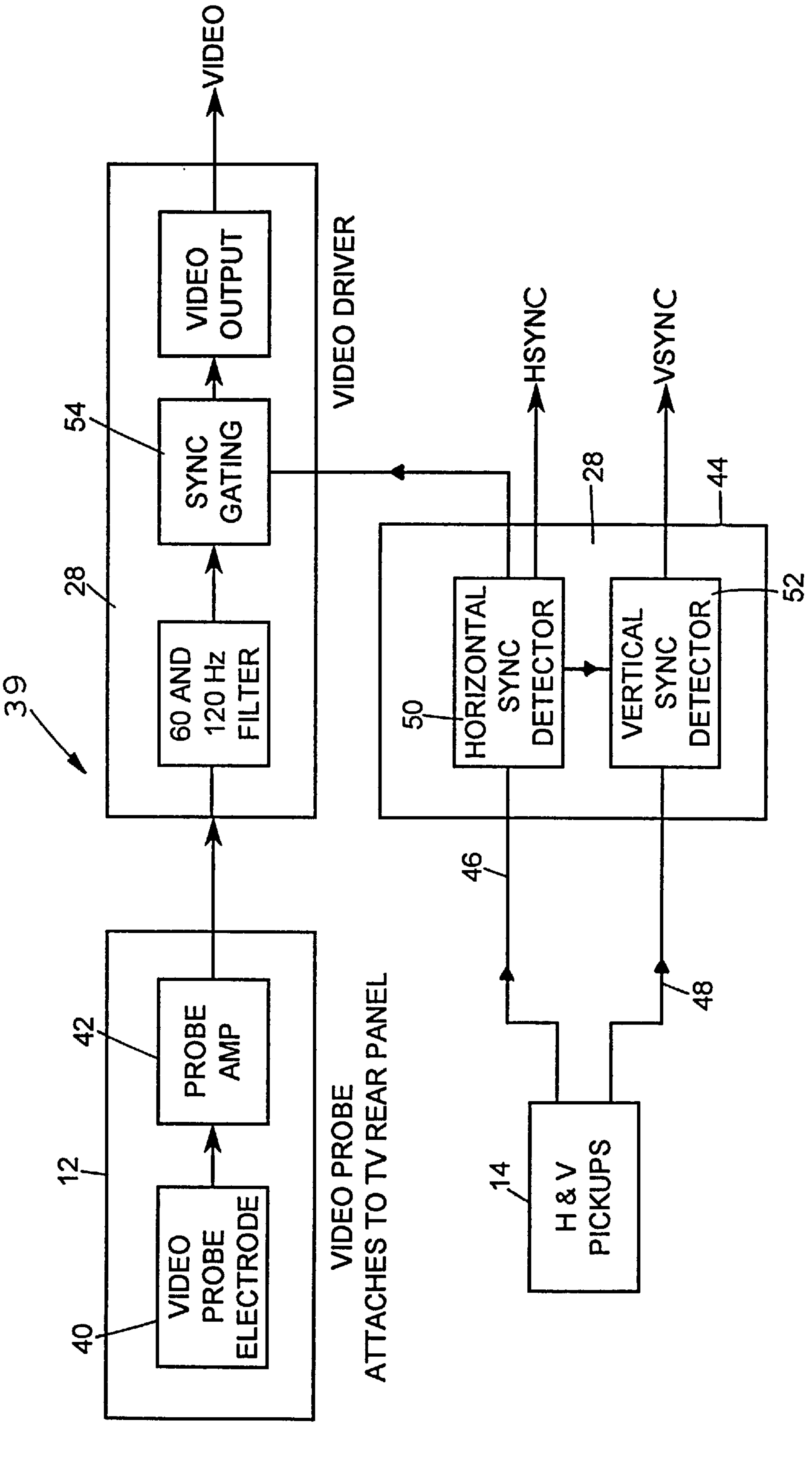
FIG. 2 is a block diagram of the sensor portion of the television audience measurement system illustrated in FIG. 1.

A sensing portion 39 of the receiver monitoring system 8 is depicted in FIG. 2. The capacitive non-invasive video sensor 12 of the sensing portion 39 includes a capacitive video probe 40 and a video probe amplifier 42 which feeds a video signal to the video processor 28. The non-invasive horizontal and vertical sync sensor 14 provides signals to an H/V sync driver 44 by means of a horizontal synchronization signal lead 46 and a vertical synchronization signal lead 48. The H/V sync driver 44 includes a horizontal sync detector 50 and a vertical sync detector 52. The horizontal sync detector 50 supplies a horizontal sync signal to a sync gate 54 in order to initiate replacement of the horizontal sync component of the composite video signal acquired by the capacitive non-invasive video sensor 12 with a standardized sync signal as will be described in greater detail hereinafter.

Figure 3:
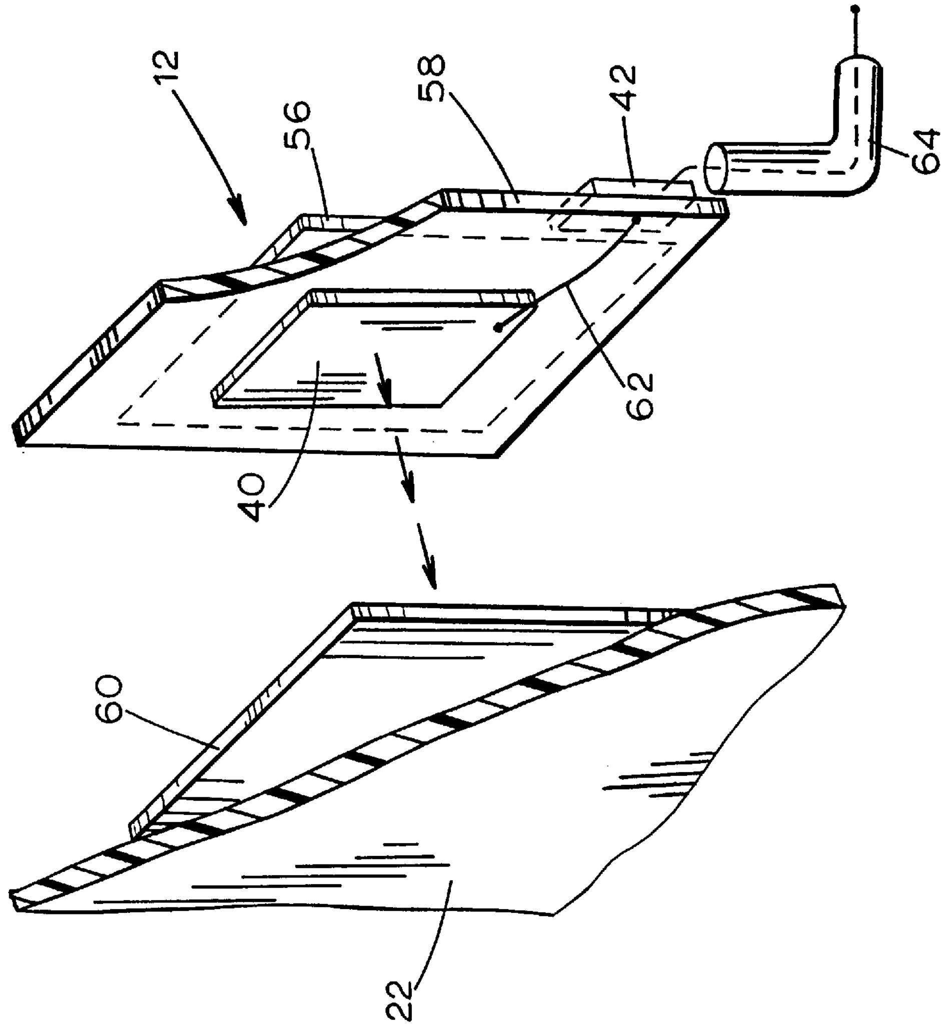
FIG. 3 is an elevational view of the non-invasive video sensor of the present invention.

The capacitive non-invasive video sensor 12 is shown in more detail in FIG. 3. The capacitive non-invasive video sensor 12 includes the capacitive video probe 40 (which is preferably a thin sheet of copper foil) separated from a shield electrode 56 by a dielectric support layer 58. For example, the capacitive video probe 40 may be more specifically arranged as described in co-pending U.S. patent application Ser. No. 08/482,820 filed on Jun. 7, 1995 in connection with the foil 120*b* and the terminator resistor 120*c* of the non-intrusive sensor 120 shown in FIG. 6 thereof. The dielectric support layer 58 may preferably be a Type G10 circuit board having a thickness of 1.5–2.0 mm that also supports the video probe amplifier 42. In a preferred embodiment of the capacitive non-invasive video sensor 12, the capacitive video probe 40 is a twenty eight by forty five millimeter rectangle that is mounted facing the socket 24 (such as by means of a double-faced adhesive tape 60 adhering the capacitive video probe 40 to the housing back surface 22).

The signal from the capacitive video probe 40 is supplied as an input to the video probe amplifier 42 over a coupling 62, and the output of the video probe amplifier 42 is conveyed to the video processor 28 by a shielded cable 64. The shield electrode 56, in this configuration, is a larger rectangle extending beyond the capacitive video probe 40 by, for example, about ten millimeters or more on each side. The shield electrode 56 may be a ground plane, such as a piece of copper foil, extending somewhat beyond the capacitive video probe 40 in each direction. Interposing the capacitive video probe 40 between the video signal source (in this case, the socket 24 of the display 20) and the closely-spaced shield electrode 56 prevents the capacitive video probe 40 from responding to capacitance to ground changes occurring behind the display 20. For example, the shield electrode 56 ensures that sensing of the video signal by the capacitive video probe 40 at the socket 24 of the display 20 is not affected by people walking behind the television receiver 18 or in front of a projection receiver.

Figure 4:
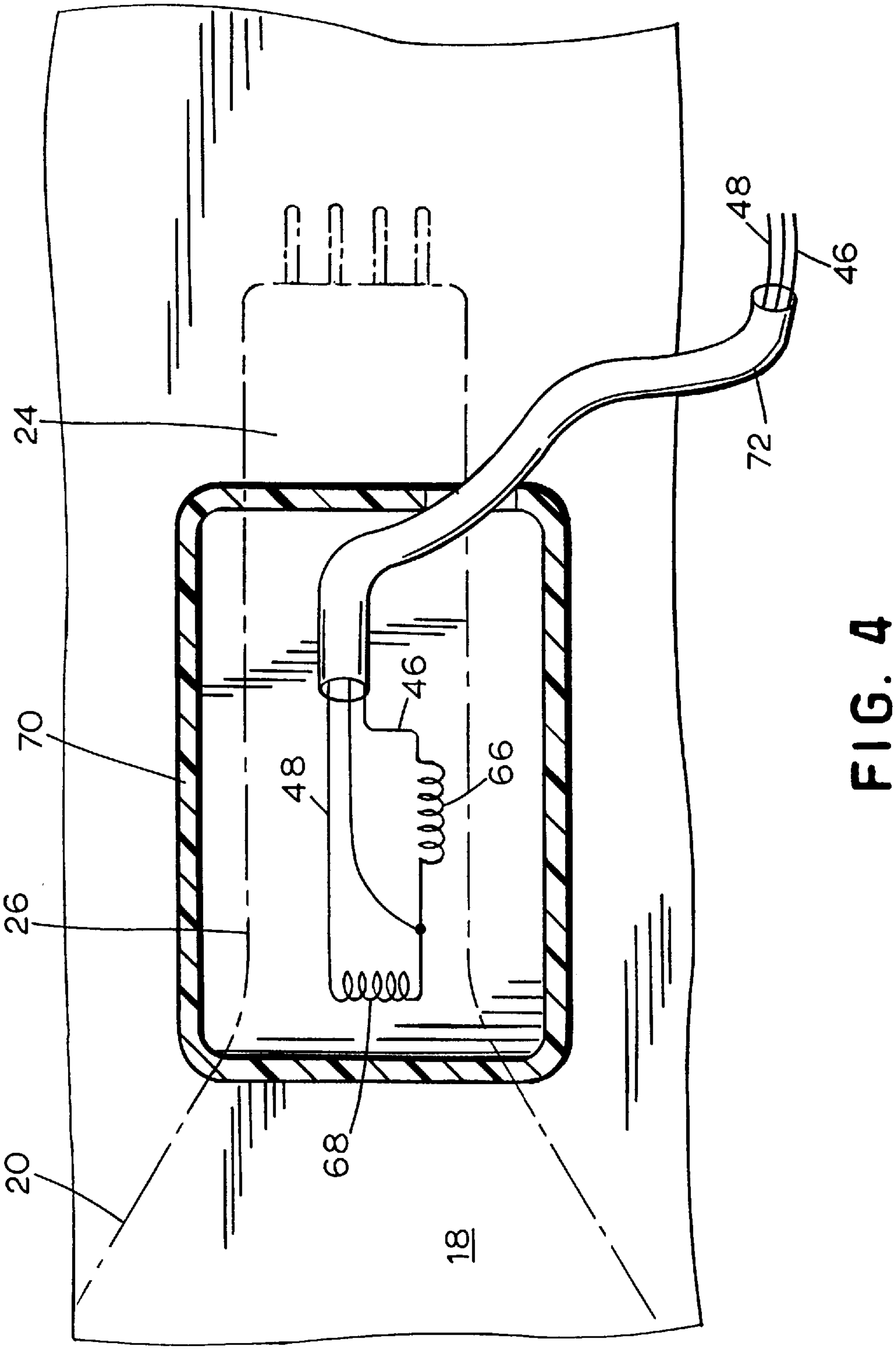
FIG. 4 is a plan view of the non-invasive horizontal and vertical synchronization signal sensor of the present invention.

The non-invasive horizontal and vertical sync sensor 14, as depicted in a partly schematic and partly cutaway plan view in FIG. 4, includes a horizontal sync pick-up coil 66 and a vertical sync pick-up coil 68 which are contained in a housing 70. The horizontal sync pick-up coil 66 and the vertical sync pick-up coil 68 are connected to the horizontal sync detector 50 and the vertical sync detector 52 by a coaxial shielded cable 72. As illustrated in FIG. 4, the lengthwise axis of the horizontal sync pick-up coil 66 of the non-invasive horizontal and vertical sync sensor 14 is aligned approximately in parallel to the neck portion 26 of the display 20, and the lengthwise axis of the vertical sync pickup coil 68 of the non-invasive horizontal and vertical sync sensor 14 is aligned approximately perpendicularly to the neck portion 26 of the display 20.

Similar sensors with only a single coil have been used for many years in the television audience measurement art to determine when a television receiver 18 is turned on. Hence, those skilled in the art will recognize that the non-invasive horizontal and vertical sync sensor 14 may be located in a number of other positions adjacent the housing back surface 22 and within the fringing magnetic field of the deflection coils of the display 20 to reliably sense the horizontal and/or vertical sync signals. For example, the non-invasive horizontal and vertical sync sensor 14 may be located on one of the sides of the television receiver 18 with the horizontal sync pick-up coil 66 and the vertical sync pickup coil 68 aligned properly with respect to the neck portion 26 of the display 20.

It should be noted that, because of the symmetry of the magnetic fields produced by the deflection coils of the television receiver 18, the sensing of the horizontal and vertical sync signals by the non-invasive horizontal and vertical sync sensor 14 is preferably accomplished at some radial distance from the axis of the display 20. The preferred location for the capacitive non-invasive video sensor 12, which is immediately behind the socket 24, is thus a poor choice of position for the non-invasive horizontal and vertical sync sensor 14. In fact, measurements of the horizontal sync signal made immediately behind the socket 24 can provide anomalous readings. For example, for some television receivers, the measured pulses have a polarity which is opposite to that required for proper operation of the display 20. Thus, it is clear that the capacitive non-invasive video sensor 12, which senses the video signal, and the non-invasive horizontal and vertical sync sensor 14, which senses the horizontal and vertical sync signals, should be separately disposed. The separate disposition of the video signal pick up sensor and the sync sensor provides a significant improvement in a non-invasive television tuning measurement.

Figure 5:
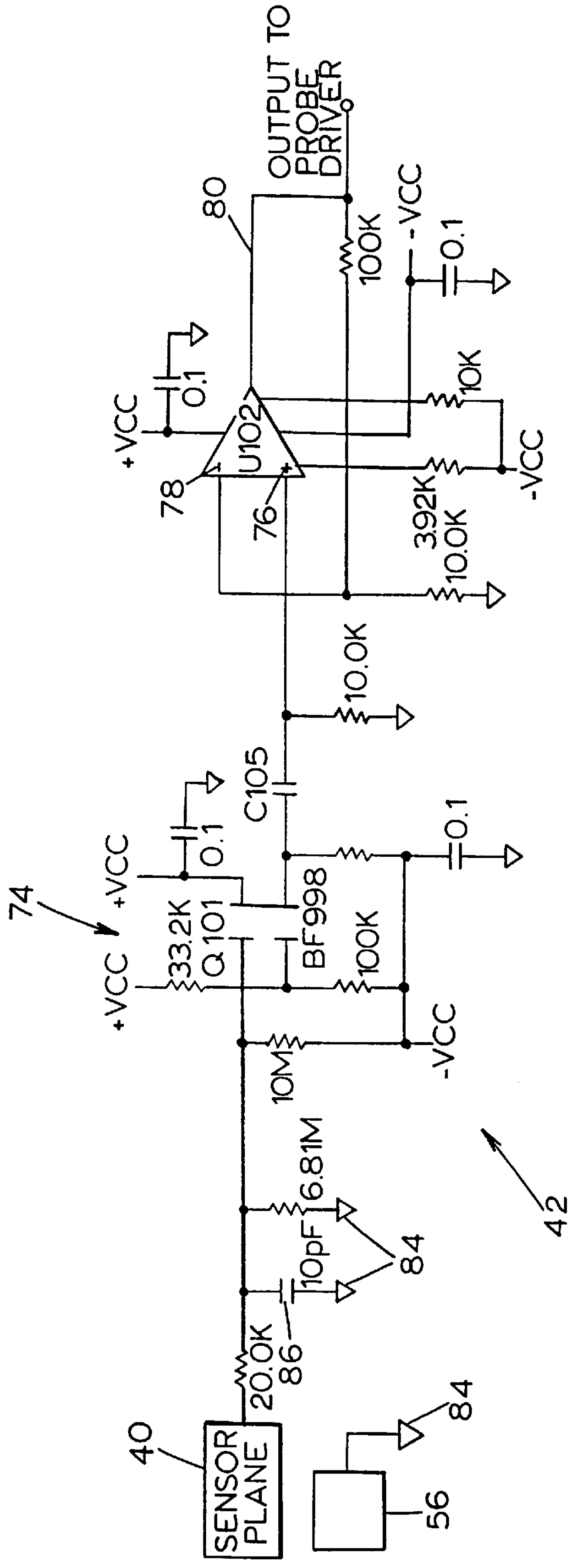
FIG. 5 is a circuit schematic of a circuit which processes the output of the non-invasive video sensor of the present invention.

The video probe amplifier 42, shown in more detail in FIG. 5, is used to amplify the signal acquired by the capacitive non-invasive video sensor 12. The capacitive video probe 40 is connected to a MOSFET buffer 74 that has an output capacitively coupled to an input terminal 76 of a high impedance amplifier 78. The high impedance amplifier 78, for example, may be a type LM 6361 manufactured by National Semiconductor Corporation. The high impedance amplifier 78, in turn, has an output 80 which is connected to a video output driver 82 (FIG. 7) performing the function of the sync gate 54. The shield electrode 56 is connected to a common circuit ground 84.

Also connected to the common circuit ground 84 is a trimming capacitor 86, which provides a standardized input capacitance to keep the video probe amplifier 42 from being overly sensitive to the chosen thickness of the dielectric support layer 58. The trimming capacitor 86, which preferably has a value of ten picofarads in one embodiment, also serves to control the high frequency roll-off characteristics of the acquired video signal. By balancing the values of the trimming capacitor 86 and the capacitance between the capacitive video probe 40 and the shield electrode 56, an improved low frequency response to the sensed signal is provided.

Figure 6:
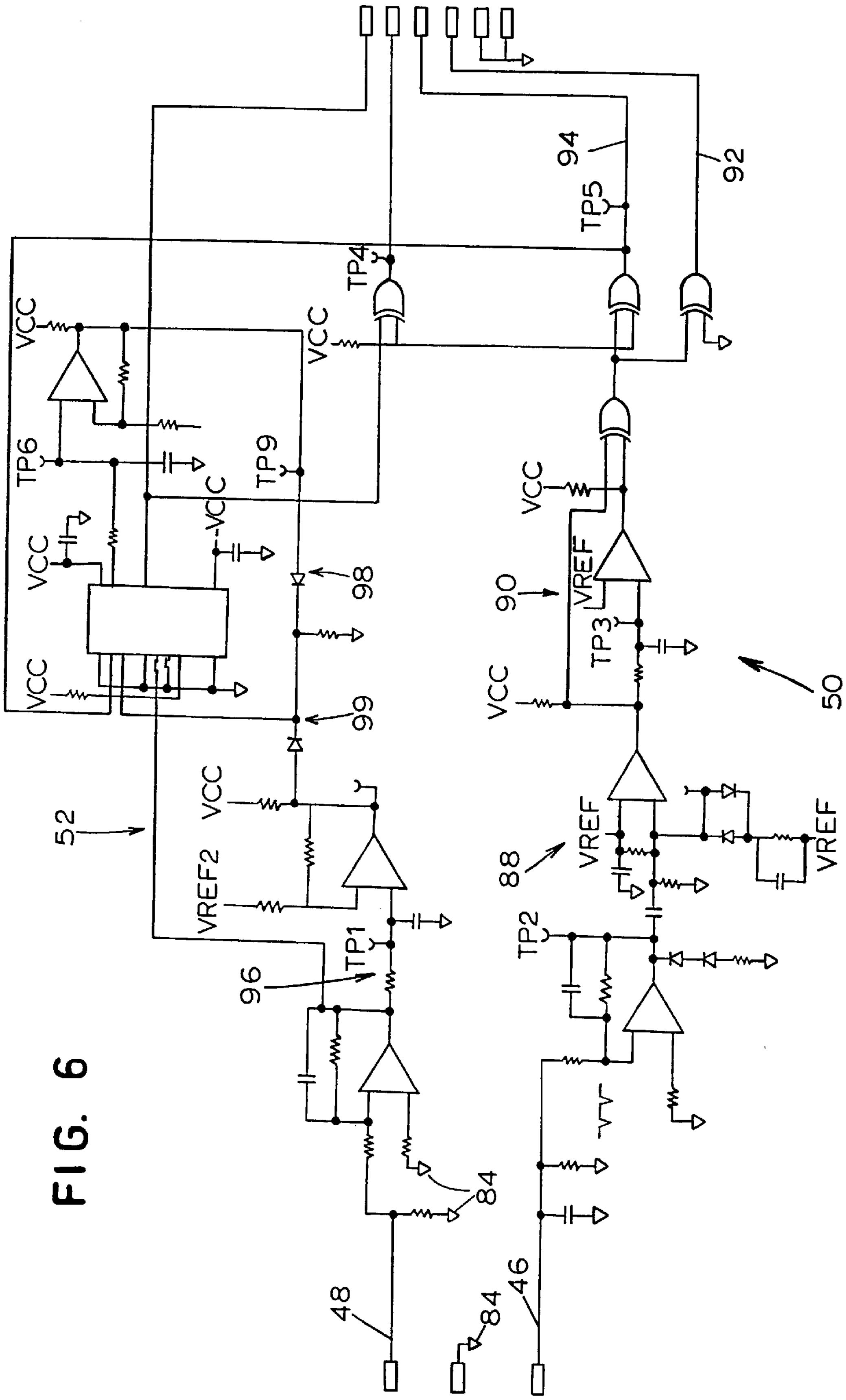
FIG. 6 is a circuit schematic of a circuit which processes the output of the non-invasive horizontal and vertical synchronization signal sensor of the present invention.

The circuitry for processing the horizontal and vertical sync signals is shown in greater detail in FIG. 6 of the drawing. The horizontal signal is detected by the horizontal sync detector 50, and the vertical sync signal is detected by the vertical sync detector 52. Both of the horizontal sync detector 50 and the vertical sync detector 52, for example, may use OP AMPS of the OP275 type manufactured by Analog Devices Corporation.

The horizontal sync signal on the horizontal synchronization signal lead 46 is supplied to the horizontal sync detector 50 which includes a horizontal sync comparator stage 88. The horizontal sync comparator stage 88 compares the horizontal sync signal with a reference level. The horizontal sync comparator stage 88 cleans up the horizontal sync signal and blocks out noise, such as vertical sync signal artifacts, without the delay normally produced by heavy filtering. The output of the horizontal sync comparator stage 88 is connected to a conditional complementor stage 90 that detects the polarity of the horizontal sync signal. If the polarity of the horizontal sync signal differs from the standard polarity, the conditional complementor stage 90 inverts the horizontal sync signal from the horizontal sync comparator stage 88 to ensure that the horizontal sync signals on the signal lines 92 and 94 have appropriate polarities.

Similarly, the vertical sync signal on the vertical synchronization signal lead 48 is supplied to a vertical sync comparator stage 96 of the vertical sync detector 52. The vertical sync comparator stage 96 compares the vertical sync signal with a reference level. The vertical sync detector 52 has two vertical sync signal paths. The first path has a vertical sync comparator stage 96 which cleans up the vertical sync signal and blocks out noise, such as horizontal signal artifacts, with a heavy low pass filter that produces more delay but a robust vertical sync signal. The second path has a sync chopper 98, which removes horizontal sync artifacts from the vertical sync signal, and a light low pass filter. The second path produces less delay but a high noise level vertical sync signal. The two paths of vertical sync signals are OR gated by an OR gate 99 in order to form a very little delayed, noise free, and stable vertical sync signal which is then output to the program recognition apparatus 30. One of the horizontal sync outputs and one of the vertical sync outputs produced by the apparatus illustrated in FIG. 6 are connected to the program recognition apparatus 30. The chopper 98, for example, may employ a type CD 4053 circuit made by the Motorola Corporation.

Figure 7:
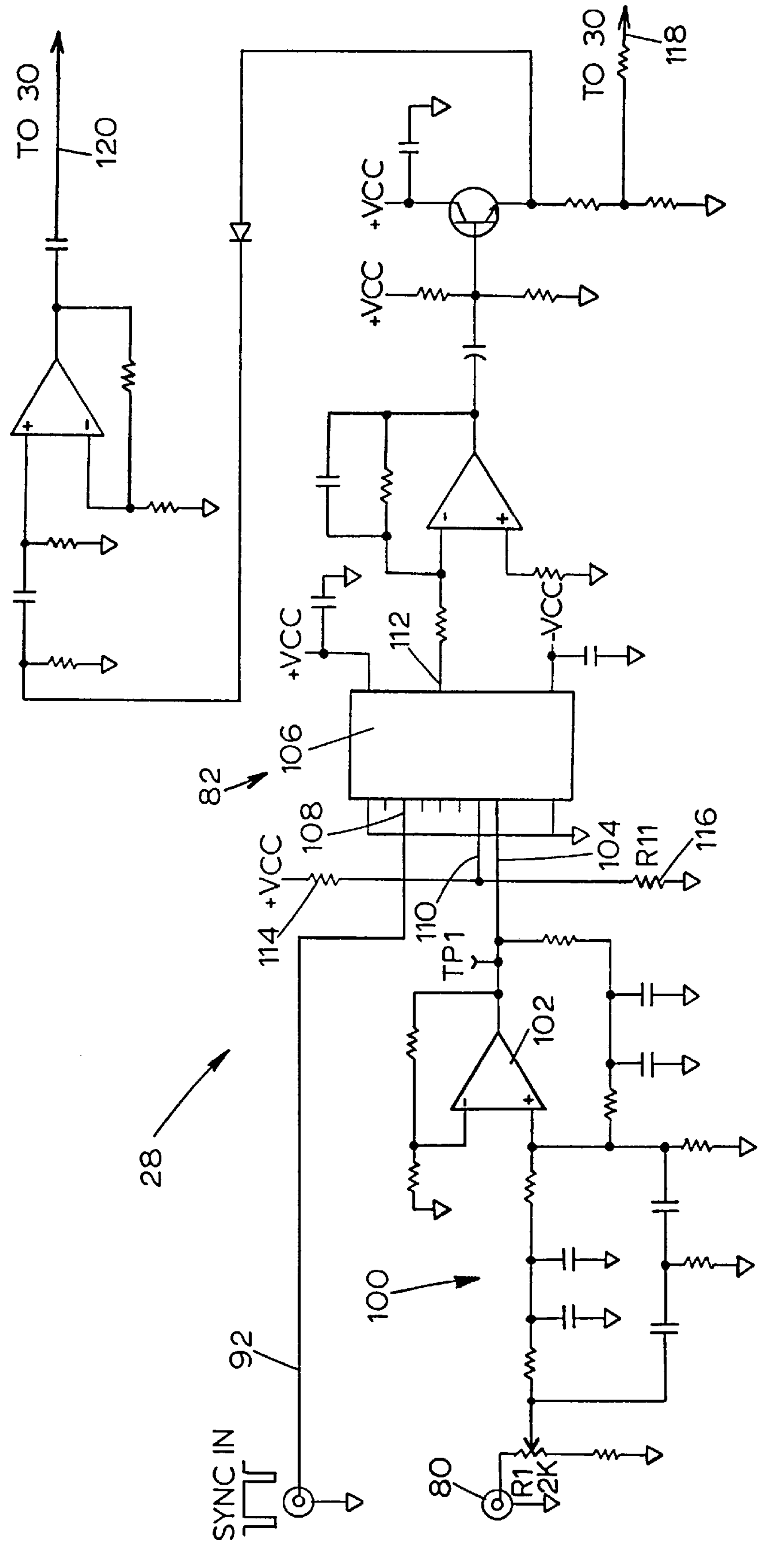
FIG. 7 is a schematic diagram of a sync signal removal and replacement circuit; and, FIG. 8 is a graphical representation of signal amplitude as a function of frequency of the signal at the output of the circuit of FIG. 7.

As discussed above, the baseband video signal from the video probe amplifier 42 is input to the video output driver 82. As shown in FIG. 7, the video output driver 82 includes a high pass and notch filter 100 that severely attenuates those components of the baseband video signal about a frequency which is an integral multiple of the power line frequency. Although the integral multiple may be any number including one, it is preferable that the high pass and notch filter 100 attenuate those components of the baseband video signal at the first harmonic of the power line frequency, e.g., at 120 Hz. The resultant high-passed baseband video signal is then amplified by an operational amplifier 102. The operational amplifier 102, for example, may be a Type OP275 operational amplifier. The output from the operational amplifier 102 is applied to one terminal 104 of a video switch 106. The video switch 106, for example, may be a type CD 4053.

The signal line 92 of the horizontal sync detector 50 is connected to a control terminal 108 of the video switch 106. When a horizontal sync pulse is picked up by the non-invasive horizontal and vertical sync sensor 14, the resultant voltage applied to the control terminal 108 causes the video switch 106 to couple an input 110 to its output terminal 112. The voltage on the input 110 has a controlled polarity and magnitude as determined by a voltage divider which includes dropping resistors 114 and 116 connected between a source voltage $V_{cc}$ and circuit common. On the other hand, when a horizontal sync pulse is not present, the video switch 106 couples the high-passed baseband video signal from the operational amplifier 102 to the output terminal 112.

Accordingly, the video switch 106 removes any horizontal sync component in the baseband video signal and replaces the removed horizontal sync component with a better horizontal sync signal under control of the horizontal sync detector 50. Thus, by using the capacitive non-invasive video sensor 12, the non-invasive horizontal and vertical sync sensor 14, and the video switch 106, a modified video signal having a standardized horizontal sync component is provided at an analog output 118 and a code output 120 of the video output driver 82. The output 118 may be used for pattern recognition in order to identify the program or channel being viewed on a television. The output 120 is buffered and may be used to detect program or channel identifying codes embedded in the modified video signal.

Figure 8:
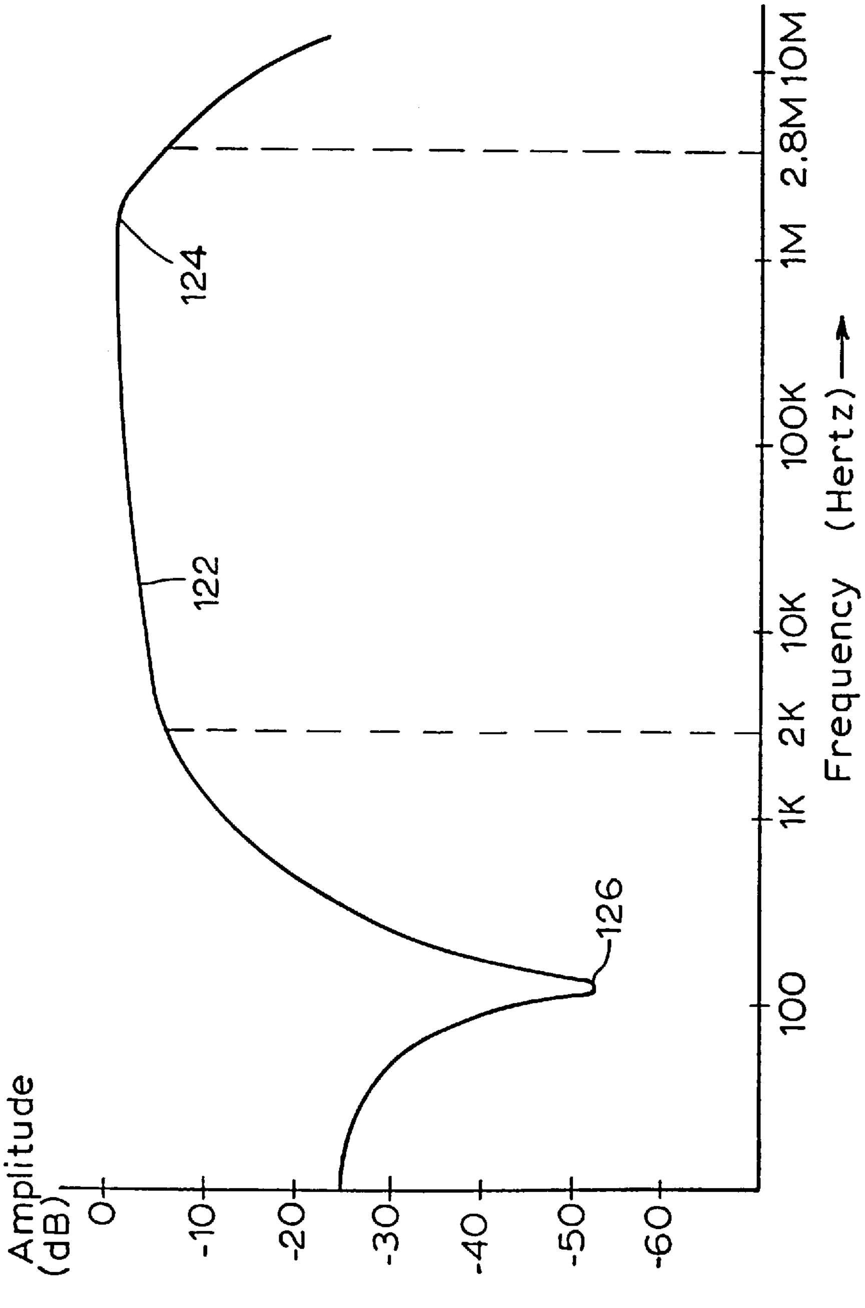

A preferred spectral profile of the amplitude of the modified video signal at the output 118 is depicted in FIG. 8. This preferred spectral profile is illustrated as a function of frequency is depicted in FIG. 8. The modified video signal has a spectrum 122 which has a peak amplitude 124 at approximately 1.5 MHz and a high frequency roll-off of about 6.5 dB per octave beyond 2.8 MHz. On the low frequency side of the peak amplitude 124, the amplitude of the spectrum 122 drops off more slowly and is three dB down at a frequency of about eight kHz. A notch 126 at twice the power line frequency and a response roll-off at lower frequencies avoids problems with power line-induced noise. It is noted that the notch 126 is particularly important because of AC power line noise coupled from the television power supply or emitted by a fluorescent lamp that might be near the television receiver 18, or because of noise emitted from other sources. The television power supply is commonly a switched power supply having appreciable harmonic distortion in its output. This harmonic distortion is particularly severe at low integral multiples of the power line frequency. In older televisions, for example, appreciable power is often radiated from the CRT filament connections. In newer televisions having an AC to DC converter, the AC to DC converter is often noisy. In almost all cases, the noise situation is exacerbated by the conventional lack of a common ground between the AC power line and the television's direct current circuitry.

The modified video signal at the analog output 118 of the video output driver 82 has adequate bandwidth for use with either systems which detect ancillary codes or systems which employ video pattern recognition. The analog output 118 (and/or the code output 120) is connected to the program recognition apparatus 30. As discussed above, the program recognition apparatus 30 either detects an ancillary code in the modified video signal or extracts a pattern from the modified video signal for comparison to a library of reference patterns. In this manner, the program being viewed on the television receiver 18 may be identified.

Some systems, which encode programs with ancillary codes, insert the ancillary codes into low energy portions of the video spectrum (e.g., at about two megahertz above the bottom of the video band). Such a frequency based system is disclosed in Loughlin, et al., U.S. Pat. No. 3,838,444. The response provided by the apparatus of the present invention, as depicted in FIG. 8, is only 2.5 dB down from its peak amplitude 124 at this low energy frequency and is, therefore, useful in this type of frequency based system.

Other encoding systems add ancillary codes in otherwise unused parts of a video frame. For example, the AMOL system disclosed in the aforementioned Haselwood, et al. patent is a time based system which adds ancillary codes on lines of the vertical blanking interval. The system depicted in FIG. 8 is compatible with writing fifty or more bits within an NTSC line having a duration of sixty four microseconds and is, therefore, useful with time-based, as well as with frequency-based, encoding arrangements.

As described above, the present invention permits the non-invasive acquisition of a video signal from a sampled television receiver. The video signal can then be further processed in order to extract a program identifying ancillary code therefrom and/or in order to extract a pattern which can be used in a pattern recognition system to identify the program. The apparatus of the present invention includes two detectors separately positioned adjacent to the cathode ray tube (CRT) of a television receiver. A first of the detectors is a shielded capacitive sensor positioned on the back of the receiver immediately adjacent the CRT guns. The other detector is an inductive sensor preferably located on the top of the receiver and picks up signals representative of the horizontal and vertical synchronization frequencies and phases of the receiver. An electronic filter means attenuates both the power line frequency and the first harmonic thereof.

Certain modifications of the present invention have been described above. Other modifications of the present invention will occur to those skilled in the art. For example, although the capacitive non-invasive video sensor 12 is described above as being immediately behind the socket 24 of the display 20, it should be apparent that the capacitive non-invasive video sensor 12 can be located in any position to sense the video signal. Also, although composited data is communicated to a central data collection office 34 via the public switched telephone network 36, as disclosed above, other communication channels, such as radio frequency or microwave channels and satellite systems may instead by used. Additionally, although the present invention has been disclosed in connection with the monitoring of a television receiver, the present invention may be used in connection with the monitoring of any type of receiver. Moreover, as described above, the video switch 106 responds to a horizontal sync pulse, which is picked up by the non-invasive horizontal and vertical sync sensor 14, by coupling a standard horizontal sync pulse (based upon the voltage at the input 110) to its output terminal 112. Thus, the relatively weak or distorted horizontal sync component of the video signal from the operational amplifier 102 is removed and is replaced with a more accurately synthesized horizontal sync signal. Instead, however, the horizontal sync pulse picked up by the non-invasive horizontal and vertical sync sensor 14 could be used to directly replace the weaker or distorted horizontal sync component of the video signal from the operational amplifier 102. Accordingly, it is intended that all such modifications and alterations be considered as within the spirit and scope of the invention as defined in the attached claims.

What is claimed is:

1. A sensing arrangement for non-invasively sensing signals of a receiver, wherein the receiver has a CRT having an electron beam axis, the sensor arrangement comprising:

a program signal sensor disposed (i) on an exterior surface of a housing, (ii) proximate to the receiver and substantially in alignment with the electron beam axis of the CRT, and (iii) in a position to sense program content carried by a program signal, the program signal sensor arranged to acquire the program signal when the receiver is in operation; and, a sync signal sensor disposed on the exterior surface of the housing in a position to sense synchronization components and spaced apart from the program signal sensor.

2. The sensing arrangement of claim 1 wherein the program signal sensor is a capacitive pick up, and wherein the sync signal sensor is an inductive pick up.

3. The sensing arrangement of claim 2 wherein the inductive pick up is a first inductive pick up, wherein the sync signal sensor has a second inductive pick up, wherein each of the first and second inductive pick ups has an axis, wherein the axes of the first and second inductive pick ups are perpendicular to each other.

4. The sensing arrangement of claim 2 further comprising signal filtering means for filtering the acquired program signal, the signal filtering means removing from the acquired video signal a narrow band of frequencies centered about an integral multiple of a power line frequency.

5. The sensing arrangement of claim 1 further comprising signal filtering means for filtering the acquired program signal, the signal filtering means removing from the acquired video signal frequencies based upon a power line frequency.

6. The sensing arrangement of claim 1 wherein the program signal sensor is disposed approximately concentrically along an axis of the receiver and the sync signal sensor is disposed radially from the axis.

7. A system for non-invasively sensing signals of a receiver comprising:

a video signal detecting apparatus having a capacitive pick up, the video signal detecting apparatus disposed on an exterior surface of a housing proximate to a socket of a CRT of the receiver, the video signal detecting apparatus acquiring a video signal when the receiver is in operation, the acquired video signal having a first horizontal sync component;

a sync signal detecting apparatus having an inductive pick up, the sync signal detecting apparatus disposed on an exterior surface of the housing and spaced apart from the video signal detecting apparatus, the sync signal detecting apparatus having as an output a second horizontal sync component; and, signal processing means for processing the acquired video signal, the signal processing means creating a modified video signal by replacing the first horizontal sync component in response to the second horizontal sync component, the signal processing means supplying the modified video signal as an input to a recognition apparatus.

8. The system of claim 7 wherein the inductive pick up is a first inductive pick up, wherein the sync signal detecting apparatus comprises a second inductive pick up arranged to detect a vertical sync component, wherein each of the first and second inductive pick ups has an axis, wherein the axes of the first and second inductive pick ups are perpendicular to each other.

9. The system of claim 7 further comprising signal filtering means for filtering the acquired video signal, the signal filtering means removing from the acquired video signal frequencies based upon a power line frequency.

10. The system of claim 7 wherein the recognition apparatus is arranged to read a broadcast ancillary code and to store the broadcast ancillary code.

11. The system of claim 7 wherein the recognition apparatus is arranged to extract a pattern for use in pattern recognition.

12. Apparatus for acquiring a modified baseband video signal from a CRT, the apparatus comprising:

a video probe having a video signal output, wherein the video probe is disposed adjacent to a socket of the CRT, wherein the video probe comprises a capacitive pick up plate and a capacitive shield plate adjacent the capacitive pick-up plate, and wherein the capacitive shield plate is located farther from the socket than the capacitive pick-up plate;

a sync probe having a sync signal output, the sync probe spaced apart from the video probe; and, sync signal replacing means having the sync signal output and the video signal output as inputs, the sync signal replacing means replacing a horizontal sync component of the video signal output with a horizontal sync signal in response to the sync signal output, the sync signal replacing means having as an output the modified baseband video signal.

13. The apparatus of claim 12 wherein the video probe is disposed on a first exterior surface of a housing adjacent a socket of the CRT, and wherein the sync probe is disposed on a second exterior surface of the housing.

14. The apparatus of claim 12 further comprising a filter arranged to filter out frequencies based upon a power line frequency.

15. Apparatus for acquiring a modified baseband video signal from a CRT, the apparatus comprising:

a video probe having a video signal output, the video probe disposed adjacent to a socket of the CRT;

a sync probe having a sync signal output, the sync probe spaced apart from the video probe, wherein the sync probe comprises two inductive pickups having substantially mutually perpendicular axes; and, sync signal replacing means having the sync signal output and the video signal output as inputs, the sync signal replacing means replacing a horizontal sync component of the video signal output with a horizontal sync signal in response to the sync signal output, the sync signal replacing means having as an output the modified baseband video signal.

16. The apparatus of claim 15 wherein the axis of one of the two inductive pick ups is parallel to an axis of the CRT.

17. A method of reading an ancillary code transmitted with a television broadcast received in a dwelling and displayed on a television receiver having a CRT, the method comprising the steps of:

a) acquiring a baseband video signal by use of a capacitive sensor disposed on an exterior of the receiver proximate to a socket of the CRT;

b) acquiring a horizontal sync signal by use of an inductive sensor disposed on the exterior of the receiver in spaced apart relation to the capacitive sensor;

c) removing, from the baseband video signal, a horizontal sync component thereof;

d) replacing the removed horizontal sync component with a standard horizontal sync signal in response to the horizontal sync signal acquired by the inductive sensor, thereby creating a modified video baseband signal; and, e) reading the ancillary code from the modified baseband video signal.

18. The method of claim 17 further comprising a step, intermediate steps b) and c), of removing, from the acquired video baseband signal, frequencies based upon a power line frequency.

19. The method of claim 17 further comprising the steps, intermediate steps b) and c), of detecting the polarity of the horizontal sync signal and, if the polarity differs from a predetermined polarity, of inverting the acquired horizontal sync signal.

20. A pattern recognition method for recognizing one of a plurality of television programs received in a dwelling and displayed on a television receiver having a CRT, the method comprising the steps of:

a) acquiring a baseband video signal by use of a capacitive sensor disposed on an exterior of the receiver proximate to a socket of the CRT;

b) acquiring a horizontal sync signal by use of an inductive sensor disposed on the exterior of the receiver in spaced apart relation to the capacitive sensor;

c) removing, from the baseband video signal, a horizontal sync component thereof;

d) replacing the removed horizontal sync component with a horizontal sync signal in response to the horizontal sync signal acquired by the inductive sensor, thereby creating a modified video baseband signal; and, e) supplying the modified video baseband signal to a pattern recognition apparatus.

21. The method of claim 20 further comprising the step, intermediate steps b) and c), of removing, from the video baseband signal, frequencies based upon a power line frequency.

22. The method of claim 20 comprising the additional steps, intermediate steps b) and c), of detecting the polarity of the horizontal sync signal and, if the polarity differs from a predetermined polarity, of inverting the acquired horizontal sync signal.

23. Apparatus for acquiring a baseband video signal from a CRT, the apparatus comprising:

a video probe having a video signal output, wherein the video probe comprises a capacitive pick up plate and a capacitive shield plate adjacent the capacitive pick-up plate, wherein the capacitive pick up plate is disposed adjacent to a socket of the CRT, and wherein the capacitive shield plate is located farther from the socket than the capacitive pick-up plate;

a sync probe having a sync signal output, wherein the sync probe is spaced apart from the video probe, and wherein the sync probe comprises two inductive pickups having substantially mutually perpendicular axes.

24. Apparatus for acquiring a baseband video signal from a CRT, the apparatus comprising a video probe having a video signal output, wherein the video probe comprises a capacitive pick up plate, a dielectric material, and a capacitive shield plate, wherein the capacitive pick up plate and the capacitive shield plate are separated by the dielectric material, wherein the capacitive pick up plate is disposed adjacent to a socket of the CRT, and wherein the capacitive shield plate is located farther from the socket than the capacitive pick-up plate.

* * * * *